United States Patent [19]

Koopman et al.

[11] Patent Number: 5,404,432
[45] Date of Patent: Apr. 4, 1995

[54] BIFURCATING BACKGROUND COLORS BETWEEN WORD AND NON-WORD SPACE FOR IMPROVING TEXT READABILITY

[75] Inventors: Stephan B. J. Koopman, Reuver; Fredericus R. J. Smeijers, Arnhem, both of Netherlands

[73] Assignee: OCE-Nederland, B.V., Venlo, Netherlands

[21] Appl. No.: 91,042

[22] Filed: Jul. 14, 1993

[30] Foreign Application Priority Data

Jul. 20, 1992 [EP] European Pat. Off. .......... 92202211

[51] Int. Cl.⁶ ............................................. G09G 5/30
[52] U.S. Cl. ...................................... 395/144; 395/131; 345/144; 345/149
[58] Field of Search ............... 395/144, 150, 148, 149, 395/131; 345/143, 144, 149, 141; 364/419.08, 419.12, 419.17; 434/167, 169, 178, 180

[56] References Cited

U.S. PATENT DOCUMENTS

| | | | |
|---|---|---|---|
| 3,998,310 | 12/1976 | Chaudhry | 400/111 |
| 4,777,617 | 10/1988 | Frisch et al. | 364/419.08 |
| 4,851,825 | 7/1989 | Naiman | 395/151 |
| 4,945,351 | 7/1990 | Naiman | 345/147 |
| 5,068,809 | 11/1991 | Verhelst et al. | 395/145 |
| 5,153,577 | 10/1992 | Mackey et al. | 345/149 |
| 5,201,032 | 4/1993 | Kurose | 395/150 |
| 5,248,964 | 9/1993 | Edgard et al. | 345/143 X |
| 5,255,353 | 10/1993 | Itoh | 395/126 |
| 5,266,940 | 11/1993 | Shiraishi | 345/149 X |
| 5,319,746 | 6/1994 | Toshiyaki | 395/148 |

FOREIGN PATENT DOCUMENTS

0393756 10/1990 European Pat. Off. .
0408834 1/1991 European Pat. Off. .

OTHER PUBLICATIONS

Acerson, WordPerfect Series 5 The Complete Reference, 1988 pp. 230–237, 374–377, 862–872.
Acerson, WordPerfect Series 5 Edition, 1988, pp. 417–450, 548–553, 574–579, 932.
Thornton, Creating Crosswords, WordPerfect Magazine, Feb., 1992, pp. 46–50.
Trivette, Crossword Software, PC Magazine May 28, 1991, pp. 478–479.
European Search Report Feb. 19, 1993.

*Primary Examiner*—Heather R. Herndon
*Assistant Examiner*—Anton Fetting
*Attorney, Agent, or Firm*—Birch, Stewart, Kolasch & Birch

[57] ABSTRACT

Texts of small fonts are made easier to read by displaying or printing background pixels in the spaces between characters within words with an adjusted grey level or color, which is a mix product of the grey level or color of the characters and that of the background.

16 Claims, 4 Drawing Sheets the quick brown
fox jumps over
the lazy dog

FIG. 3 the quick brown
fox jumps over
the lazy dog

FIG. 4

BIFURCATING BACKGROUND COLORS BETWEEN WORD AND NON-WORD SPACE FOR IMPROVING TEXT READABILITY

BACKGROUND OF THE INVENTION

1. Field of the Invention

The present invention relates to a method of reproducing text on a raster output device, such as a CRT screen, and to a raster output device implementing such method.

2. Description of Related Art

In order to achieve good readability of a text printed on paper or displayed on a CRT screen, it is essential that the blank spaces separating the individual words are readily perceptible, so that the reader may structure the text line into a sequence of words and may recognize the individual words by their overall appearance. In a given set of fonts with different font sizes, the width of the word-separating blanks is generally set in proportion to the average size of the characters, and the width ratio between the word-separating blanks and the white spaces between the individual characters within the word should be between 8:1 and 4:1.

In a raster output device, the image resolution is limited by the pixel size. If small font sizes, for example 9 point or smaller, are used on an ordinary CRT screen, the width of the word-separating blanks may become as small as 2 pixels. Since, however, the width of the white inter-character spaces within the words, the so-called character white, cannot become smaller than one pixel, the width ratio is reduced to 2:1, and it becomes more difficult to distinguish the word-separating blanks from the character white. In addition, the image resolution of the CRT-screen is not sufficient for reproducing all the details of the small font size characters which makes it more difficult to recognize the individual characters. Due to a combination of these effects, it becomes difficult to read the text fluently.

To alleviate this problem, one might think of increasing the word-separating blanks disproportionately, so that the width of these blanks may not become smaller than 3 pixels, for example. Then, however, the layout of the document would depend on the resolution of the raster output device with which it is reproduced. If, for example, a text which has been displayed on a CRT screen is printed with a laser printer which has a higher resolution than the CRT, the printed image would be different from the image shown on the screen, contrary to the so-called "What you see is what you get" (WYSIWYG) concept.

SUMMARY OF THE INVENTION

Therefore, it is an object of the present invention to provide a method of reproducing text on a raster output device which will overcome the above-noted disadvantages.

It is a further object of the present invention to improve the readability of the text on the raster output device, in particular for small font sizes, without violating the WYSIWYG concept.

Still, a further object of the present invention is to provide a raster output device capable of implementing the text reproduction method defined herein.

These objects and others are accomplished in accordance with the present invention, generally speaking, by providing a method of improving the readability of data or text material reproduced on a raster output device wherein at least part of the pixels in inter-character spaces within each word of the text are reproduced with an intermediate density or color which is between the density or color of the characters and that of the blank spaces between the words.

According to the present invention, if a text is displayed with dark characters on a white background, for example, the background area within the individual words is slightly shaded, whereas the blank spaces between the words are left white. Or, if a text is displayed with white characters on a dark background, the background area within the individual words is slightly lit, whereas the blank spaces between the words are left dark. As a result, the individual words appear more like coherent blocks and the perceptibility of the word borders is improved. It must of course be required that the raster output device be capable of not only producing black and white pixels but also at least one grey level for the intermediately shaded areas. This requirement can, however, be fulfilled with a large variety of raster output devices, such as CRT monitors, liquid crystal screens and the like.

The present invention is also applicable to color screens. For example, if blue characters are displayed on a white background, the background area of the individual words may be colored light blue, and, in case of a red background, purple (which is the product of mixing the character and background colors).

Preferably, the density of the shaded areas is set between 10 and 30% of the range between the background and character densities. In the case of black characters (e.g., density 100) on a white background (e.g., density 0), the intermediate density would be between 10 and 30.

It is sufficient and preferable to limit the shaded area to columns of pixels forming the side bearings of the individual characters and to retain the original background color in the rest of the character background, in particular, within the enclosed spaces in characters like "o" or "d". In such a case, a high level of image contrast is retained, so that the shape of the characters can be recognized easily.

In a practical embodiment, only a single column of pixels between the characters within a word is reproduced with the intermediate density or color. In a further embodiment, the upper and lower ends of this column are determined by the x-height of the characters (that is the height of the letter x). Thus, the column of intermediate density runs from the baseline to the upper end of the characters not having an ascender.

In an alternative further embodiment, the upper and lower ends of the column of intermediate density are determined by the highest and lowest positions occupied by both adjoining characters immediately adjacent the column. In this embodiment, the column between a letter "q" and a letter "p" following it occupies the x-height plus the descender area, whereas the column between a letter "p" and a letter "q" following it only occupies the x-height. The same rule applies for the ascender area and for capital letters.

Methods for finding word delimiters, i.e. characters separating two words, such as spaces in a text, are well known in the art and are used, for example, in hyphenation and justification algorithms. In a practical implementation of the invention, it is accordingly possible to detect the word delimiters and to fill the background or part of the background of the characters, except for the detected word delimiters, with grey pixels.

Alternatively, a special font may be used having grey pixels on one side (e.g. the right-hand side) in the character white area. In this case, even the last character of a word will appear with a slight grey-shaded seam, so that the difference between the inter-character spaces and the spaces between words is not as significant as in the first embodiment. This effect may, however, be tolerated because human visual perception tends to exaggerate contrast at the border between larger dark and bright areas, so that the grey seam at the end of the word is largely suppressed. The advantage of the alternative embodiment is that it can be implemented simply by providing an appropriate font.

In a more elaborated embodiment, two fonts are used, e.g. one having the usual white background and the other having a grey area in the right-hand part of its background. Then, for each character to be typed, a selection between these fonts is made depending on whether or not the character is followed by a word delimiter.

BRIEF DESCRIPTION OF THE DRAWINGS

Preferred embodiments of the invention will be described below in conjunction with the following drawings, wherein:

FIG. 3 is a text sample reproduced in accordance with the invention with soft fonts;

FIG. 4 is a comparative example of the same text as in FIG. 3, but reproduced in the conventional manner.

DETAILED DISCUSSION OF THE INVENTION

Figure 1:
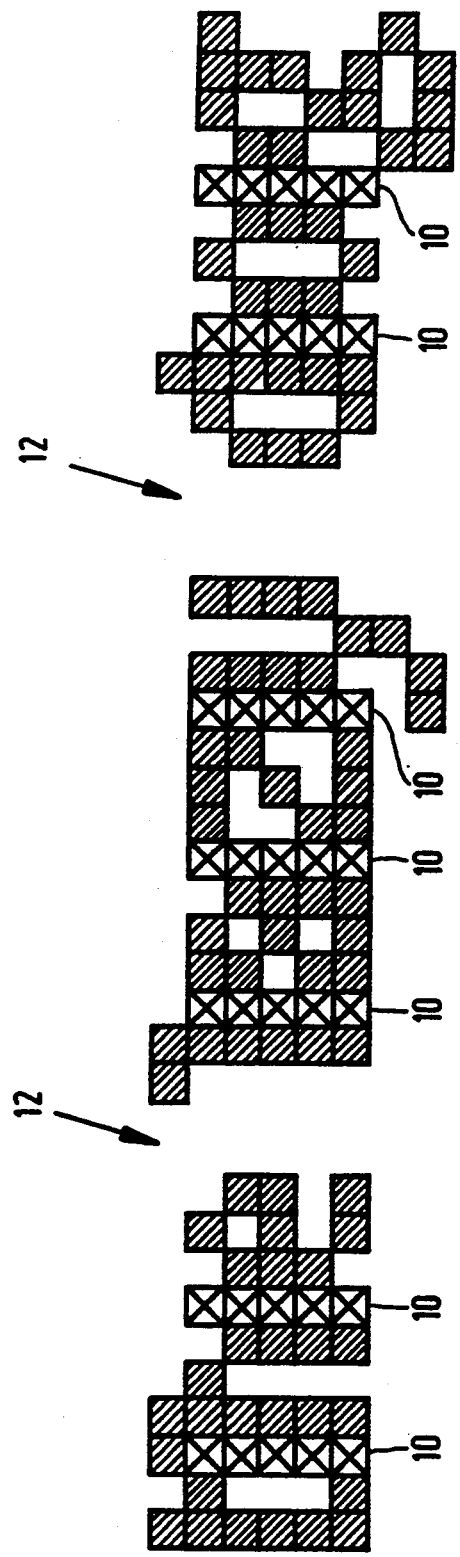
FIG. 1 is an enlarged diagram of a text sample reproduced in accordance with a first embodiment of the invention.

Referring now to FIG. 1, there is seen a pixel diagram of the text sample "the lazy dog" shown as it would appear if displayed with a font size of 8 point on a screen having a resolution of 72 pixels per inch (2.83 pixels per millimeter). Dark pixels in the filled areas of each character are represented by hatched squares, and white pixels forming the background are represented by white squares. The total height of the characters such as "t" or "h" having an ascender is six pixels, and the so-called x-height, i.e. the height of characters such as "x" or "e" having neither an ascender nor a descender, is five pixels. The individual characters of a word are separated by an inter-character space 10 which is normally called character white area and has a minimum width of 1 pixel in the shown embodiment. The blank spaces 12 between different words have a width of 2 pixels.

Each of the inter-character spaces 10 includes a column of 5 pixels, corresponding to the x-height of the characters, which are displayed with a light grey level so that they are darker than the normal background but significantly brighter than the filled areas of the characters. These pixels are marked by squares having crossed diagonals. In practice, the grey level of these pixels corresponds to approximately 20% of the grey level of the black pixels.

As a result, the characters belonging to the same word are linked together, so that the words "the", "lazy" and "dog" appear as coherent blocks which are clearly separated by the blank spaces 12.

In the procedure for reproducing the text as shown in FIG. 1, the encoded character signals are decoded sequentially and displayed on a screen as is known in the art. When a signal encoding a capital letter or a small letter has been decoded, it is checked whether the next signal stands for a word delimiter, such as a blank, a full stop, a carriage return, etc. In this case, the character white area to the right of the displayed character is left white. If it is found, however, that the next signal encodes another letter, then the space 10 between the two characters is filled with the column of five grey pixels, as shown in FIG. 1. If both letters are upper case or have ascenders facing the inter-character space, the space between the characters is filled with a column of six grey pixels corresponding to the total height of the letters. On the other hand, if both letters have descenders facing the inter-character space, the space between the characters is filled with a column of grey pixels corresponding to the total of the x-height and the descender area.

Figure 2:
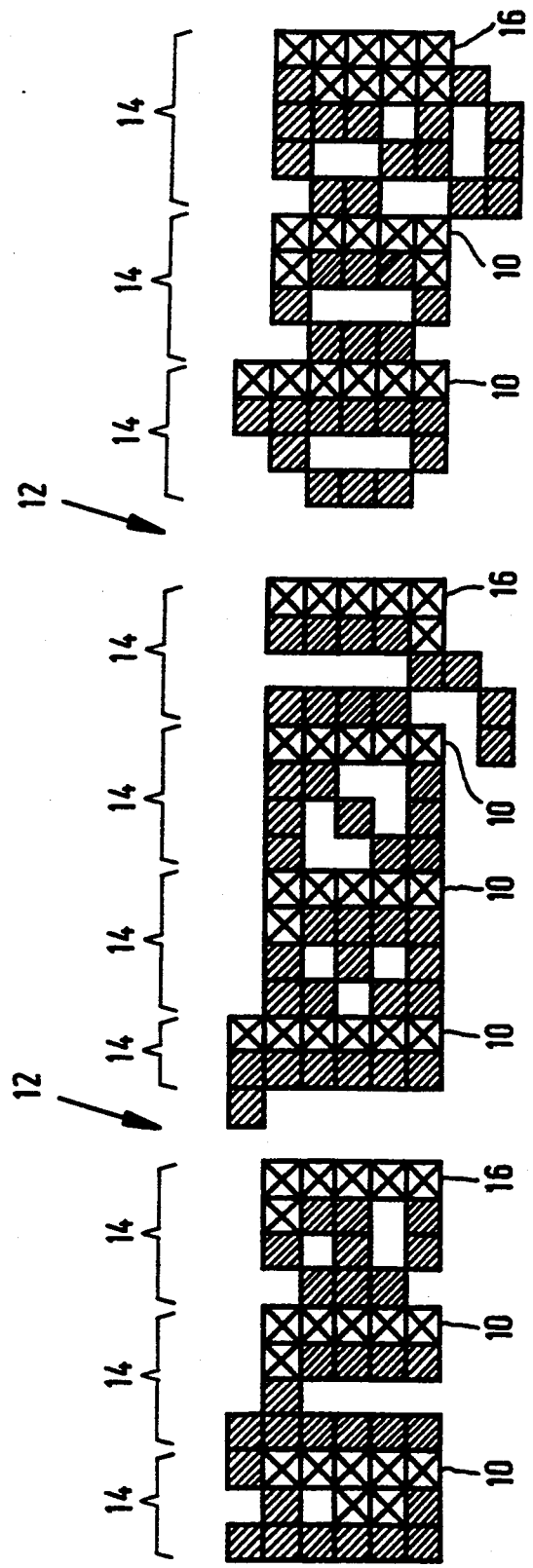
FIG. 2 is a diagram of a text sample reproduced in accordance with a second embodiment of the invention.

FIG. 2 illustrates a modified embodiment. In this embodiment, a font has been used which determines the positions of black and white, as well as grey pixels, when the font characters are expanded into pixel matrixes 14. As is shown in FIG. 2, the background on the right-hand side of each character is provided with grey pixels to form the inter-character spaces 10. However, white pixels are used for the cavities within the characters, so that the text can nevertheless be displayed with a high level of contrast. In this embodiment, a single column of grey pixels at one side of the characters, analogous to the one of the embodiment of FIG. 1, would also be effective. Such a column could have a height equal to the height of the particular character at its side facing the column, but could also have a uniform height equal to the x-height of the font characters.

Since only a single font has been used in FIG. 2, no distinction is made between characters 14 appearing at the beginning or in the middle of a word and those characters positioned at the end of a word. As a consequence, a seam 16 of grey pixels appears at the right end of each word. Nevertheless, the individual words are distinctly separated from one another because the white blanks 12 are respectively provided between the grey seam 16 of one word and the first letter of the subsequent word.

In a further modified embodiment, a second font in which the grey pixels are replaced by white pixels may be used for the respective last character of each word.

In FIGS. 3 and 4, soft fonts have been employed, wherein different grey levels are assigned to the pixels forming the characters, so as to smoothen the appearance of the characters. In FIG. 3, the inter-character spaces are filled with light-grey pixels, as described above. In this case, the grey level of the inter-character spaces is about 20% of the highest grey level appearing in the characters, which in this embodiment corresponds to the lowest grey level used in the font. However, also intercharacter grey levels, higher than the lowest grey level of the font, have successfully been used to obtain higher readability.

In order to produce the different grey levels in FIGS. 3 and 4 of the drawings, a dithering process has been employed. It should, however, be understood that this has been done solely for presentation purposes, because, according to the invention, the pixels are reproduced with uniform density.

In order to illustrate the effect of the invention, FIG. 4 shows a comparative example in which the same text as in FIG. 3 has been reproduced using the same font, but without providing the grey pixels in the inter-character spaces. It will be recognized that, in FIG. 4, it is more difficult to separate the individual words.

Figure 5:
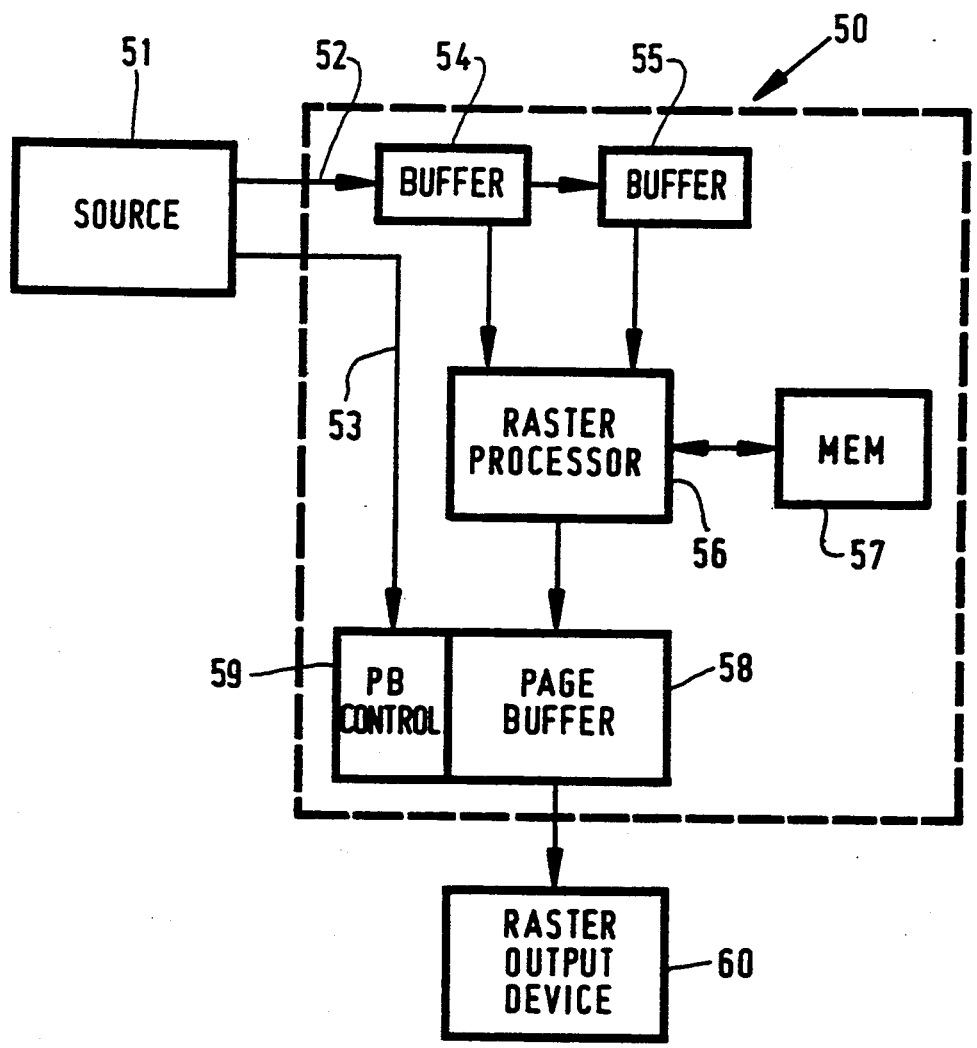
FIG. 5 is a schematic representation of an apparatus according to the invention.

FIG. 5 shows a schematic representation of an apparatus 50 for practising the method of the invention. This apparatus 50 is part of a data presentation device, such as is used in a text processing work station or a printer. It is connected to a data source 51 by an input line 52 for receiving text data to be presented. The data source 51 delivers text data in a coded format, such as ASCII, and also, on an input line 53, information on the lay-out of the text, more specifically the position of the characters.

The apparatus 50 comprises a first buffer memory 54, connected to the input line 52 and a second buffer memory 55, connected to the first one. Both buffer memories 54 and 55 are connected to a raster processor 56. The raster processor 56 is connected to a font memory 57 and to a page buffer 58, which is also, via page buffer control 59, connected to the input line 53. Further, the page buffer 58 is connected to a raster output device 60, which may be a display screen or a printer capable of printing at least three different densities (white, grey and black). Also, the raster output device may be a color display or printer.

The font memory 57 contains the pixel raster data of one or more fonts, i.e. the values of the pixels of the character boxes of the individual characters of each font and associated information, such as the position of the character boxes with respect to the base line. The font memory 57 contains two versions of every font, the first one being the "normal" version wherein each character is placed left-aligned in its character box, leaving a column of white pixels at the right-hand side of the character, which functions as the character white area when two character boxes are assembled to form words. The second font version differs from the first version in that the rightmost column of pixels (white in the first version) of the character boxes is filled with grey pixels. The horizontal extent of the character boxes is shown in FIG. 2 by reference sign 14.

In operation, text data is delivered serially by source 51 to buffer 54, which in turn delivers the data to buffer 55, one processing cycle later. This way, if buffer 55 contains the code for a particular character of the text, referred to as "current character" hereafter, buffer 54 contains the next character of the text. Raster processor 56 receives both the current and the next character from the buffers 54 and 55 and decodes them. Then the raster processor 56 classifies the current and the next character as either a letter/figure or a word delimiter, the latter being anything else than a letter or figure (e.g. a blank, a full stop, a semicolon, a carriage return, etc.).

If both the current and next characters are letter/figures, then the raster processor 56 collects the pixel data of the current character according to the first version of the font from font memory 57. If, on the other hand, the current character is a letter/figure and the next character is a word delimiter, raster processor 56 collects the pixel data of the current character according to the second version of the font from the font memory 57. If the current character is a word delimiter, then the first font version is selected.

The raster processor 56 then delivers the selected pixel data to the page buffer 58, where they are stored at the right position to form a text image under the control of page buffer control 59, using the lay-out information on line 53. Raster output device 60 displays the entire text assembled in the page buffer 58. In the displayed text, the inter-character spaces are provided with a column of grey pixels unifying the characters of a word, whereas the spaces between the words are left white.

In a second embodiment of the apparatus, the same effect is attained using only one font version, the "normal" version mentioned above. In this embodiment, the raster processor 56 is provided with means for changing the values of the rightmost pixels of each character box into "grey", but otherwise the apparatus is identical to the one according to the first embodiment. In the second embodiment, the raster processor 56 determines which characters are to be provided with grey pixels in the very same way as the decision was made to select the second font in the first embodiment.

Then, if it is decided that the current character is to be provided with grey pixels, the positions of the highest and lowest black pixels of the rightmost column of the current character and the leftmost column of the next character are determined. The pixels in the rightmost column of the character box of the current character, from the higher of the two lowest positions to the lower of the two highest positions, inclusive, are made grey, provided that, in any case, the pixels corresponding to the x-height are always made grey. Electronic circuits for effecting this procedure are known in the art, and do not need further explanation. Alternatively, this procedure can easily be programmed in software.

The effect of this procedure is that the grey column between the letters "qp" occupies the x-height and the descender area, whereas the grey column between the letters "pq" occupies the x-height area only. On the other hand, the column between the letters "Mb" extends from the base line to the ascender height, but the column between the letters "Md" from the base line to the x-height only. If a character has a black pixel protruding from its character box, such as, e.g. the upper left pixel of the letters "l"and "h" (FIG. 2), then this pixel is left black, even if it is within a column to be made grey.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data presentation apparatus including:
   raster processor for converting text data specifying text elements, such as characters and words formed by characters, into raster image data for displaying said text elements, said raster image data comprising a pattern of filled area pixels having a first grey level or color and background pixels having a seconds, different, grey level or color; and
   a raster output device which is capable of reproducing multi-grey level or multi-color pixels, connected to said raster processor for reproducing said raster image data delivered by said raster processor;

wherein said raster processor is laid out for delivering raster image data including background pixels having an adjusted grey level or color, so that the latter background pixels are reproduced having an intermediate grey level or color resulting from mixing said first and second grey levels or colors, said background pixels having said adjusted grey level or color being situated in the spaces between the characters within each word only, to the exclusion of the spaces between the words, and above and below the characters.

2. An apparatus according to claim 1, wherein said intermediate grey level or color is between 10 and 30% of the range between said first and second grey levels or colors.

3. An apparatus according to claim 1, wherein said raster processor uses fonts comprising filled area pixels having one of a set of first grey levels or, in the case of color, saturation values specified by a font, for generating said raster image data, wherein said intermediate grey level or color results from mixing the highest of said first grey levels or color saturations and said second grey level or color.

4. An apparatus according to claim 1, wherein said raster processor delivers raster image data wherein a vertical column of pixels between said characters within a word has said intermediate grey level or color, said column being one pixel wide.

5. An apparatus according to claim 4, wherein said column has a height and a vertical position that are determined by the x-height of said characters.

6. An apparatus according to claim 4, wherein said column substantially extends from the highest to the lowest vertical position reached by both adjoining characters immediately adjacent said column of pixels.

7. An apparatus according to claims 1 or 4, wherein said raster processor employs a font which, for each character, specifies a character matrix of filled area pixels depicting the character, and background pixels, in which character matrix background pixels flanking at least one side of the character have said intermediate grey level or color, while satisfying said exclusionary language.

8. An apparatus according to claims 1 or 4, wherein said raster processor employs two fonts selectively, a first font specifying for each character a character matrix of filled area pixels of said first grey level or color, depicting the character, and background pixels having said second color; and a second font substantially identical to the first font, except in that in each character matrix background pixels flanking one side of the character have said intermediate grey level or color; and selects said first font for all characters, said one side of which borders on a word delimiter, and said second font for all other characters.

9. A method of processing text for reproduction on a raster output device which is capable of reproducing multi-grey level or multi-color pixels, comprising converting text data specifying text elements, such as characters and words formed by characters, into raster image data suitable for reproduction by said raster output device, said raster image data comprising a pattern of filled area pixels having a first grey level or color and background pixels having a second, different, grey level or color;

wherein the grey level or color of at least some of said background pixels is adjusted, so that the latter background pixels are reproduced having an intermediate grey level or color resulting from mixing said first and said second grey levels or colors, said background pixels of which the grey level or color is adjusted being situated in the spaces between the characters within each word only, to the exclusion of the spaces between the words, and above and below the characters.

10. A method according to claim 9, wherein said intermediate grey level or color is between 10 and 30% of a range between said first and second grey levels or colors.

11. A method according to claim 9, wherein fonts comprising filled area pixels having one of a set of first grey levels or, in the case of color, saturation values specified by a font, are used for generating said raster image data, and wherein said intermediate grey level or color results from mixing the highest of said first grey levels or color saturations and said second grey level or color.

12. A method according to claim 9, wherein a vertical column of pixels between said characters within a word is given said intermediate grey level or color, said column being one pixel wide.

13. A method according to claim 12, wherein said column has a height and a vertical position that are determined by the x-height of said characters.

14. A method according to claim 12, wherein said column substantially extends from the highest to the lowest vertical position reached by both adjoining characters immediately adjacent said column of pixels.

15. A method according to claims 9 or 12, wherein a font is used which for each character specifies a character matrix of filled area pixels depicting the character, and background pixels, in which character matrix background pixels flanking at least one side of the character have said intermediate grey level or color, while satisfying said exclusionary language.

16. A method according to claims 9 or 12, wherein two fonts are employed selectively, a first font specifying for each character a character matrix of filled area pixels of said first grey level or color, depicting the character, and background pixels having said second color; and a second font, substantially identical to the first font, except in that in each character matrix background pixels flanking one side of the character have said intermediate grey level or color; wherein said first font is selected for all characters the said one side of which borders on a word delimiter and said second font is selected for all other characters.

* * * * *